United States Patent
Casamassima et al.

(10) Patent No.: US 11,408,990 B2
(45) Date of Patent: Aug. 9, 2022

(54) SYSTEMS AND METHODS FOR SELECTING ULTRA-WIDEBAND PREAMBLE ACCORDING TO ENVIRONMENTAL CONDITION

(71) Applicant: NXP B.V., Eindhoven (NL)

(72) Inventors: Filippo Casamassima, Graz (AT); Wolfgang Eber, Graz (AT)

(73) Assignee: NXP B.V., Eindhoven (NL)

( * ) Notice: Subject to any disclaimer, the term of this patent is extended or adjusted under 35 U.S.C. 154(b) by 220 days.

(21) Appl. No.: 16/580,495

(22) Filed: Sep. 24, 2019

(65) Prior Publication Data
US 2021/0088645 A1    Mar. 25, 2021

(51) Int. Cl.
*G01S 13/76*    (2006.01)
*H04L 1/00*    (2006.01)
(Continued)

(52) U.S. Cl.
CPC .......... *G01S 13/762* (2013.01); *G01S 13/765* (2013.01); *H04B 1/7163* (2013.01); *H04L 1/0028* (2013.01); *H04W 84/10* (2013.01)

(58) Field of Classification Search
CPC ..... G01S 13/762; G01S 13/765; H04L 1/0028
(Continued)

(56) References Cited

U.S. PATENT DOCUMENTS 6,032,033 A * 2/2000 Morris ............... H04B 7/0811
370/347
7,339,883 B2 * 3/2008 Santhoff ............ H04B 1/71632
370/335
(Continued)

FOREIGN PATENT DOCUMENTS

DE    102005021518 B4 *  5/2013  ....... H04L 25/03866
EP       3367122 A1 *  8/2018  ......... G01S 13/0209
(Continued)

OTHER PUBLICATIONS

Kreiser Dan et al. : "Multiple sensor node synchronization for parallel UWB communication and ranging", 2014 IEEE international conference on ultra-wideband (ICUWB), IEEE, Sep. 1, 2014, pp. 398-402, XP032684186, DOI: 10.1109/ICUWB.2014.6959015 (Year: 2014).*

(Continued)

*Primary Examiner* — Bernarr E Gregory
*Assistant Examiner* — Nuzhat Pervin

(57) ABSTRACT

An ultra-wideband (UWB) wireless communication system comprises a first wireless transceiver that outputs a unit of data having a first preamble that includes data for performing a time-of-flight distance measurement; a second wireless transceiver that replaces the first preamble of the unit of data with a second preamble for providing a performance level required for the time-of-flight distance measurement between the first and second wireless transceivers commensurate with an environment in which the second wireless transceiver is used; and a communication link between the first and second wireless transceivers that transmits the unit of data having the first preamble from the first wireless transceiver to the second wireless transceiver, transmits the second preamble from the second wireless transceiver to the first wireless transceiver, and exchanges subsequent electronic communications between the first and second wireless transceivers using the second preamble.

18 Claims, 4 Drawing Sheets

(51) Int. Cl.
*H04B 1/7163* (2011.01)
*H04W 84/10* (2009.01)

(58) Field of Classification Search
USPC .......................................................... 342/21
See application file for complete search history.

(56) References Cited

U.S. PATENT DOCUMENTS

| | | | | |
|---|---|---|---|---|
| 7,411,898 B2* | 8/2008 | Erlich | ............... | H04L 25/03866 370/208 |
| 7,512,185 B2* | 3/2009 | Sharon | ................ | H04B 1/7176 375/260 |
| 7,529,547 B2* | 5/2009 | Twitchell, Jr. | .... | H04W 52/0229 455/442 |
| 8,335,198 B2* | 12/2012 | Stacey | ................ | H04W 28/06 370/328 |
| 8,369,451 B2* | 2/2013 | Lakkis | ............... | H04J 13/0014 375/279 |
| 8,472,497 B2* | 6/2013 | Lakkis | ................... | H04J 13/16 375/130 |
| 8,730,927 B2* | 5/2014 | Thoukydides | ......... | H04B 15/02 370/338 |
| 8,798,221 B1* | 8/2014 | Marsh | ................ | H04L 27/2692 375/365 |
| 8,879,478 B2* | 11/2014 | Vujcic | ............... | H04W 74/0866 455/450 |
| 9,330,561 B2* | 5/2016 | Proud | ................... | A61B 5/1118 |
| 9,661,472 B2* | 5/2017 | Gherardi | ............... | H04W 4/029 |
| 9,756,403 B2* | 9/2017 | Proud | ................... | A61B 5/02055 |
| 10,302,737 B2* | 5/2019 | Hehn | ..................... | G05D 1/101 |
| 10,305,540 B2* | 5/2019 | McLaughlin | ...... | H04B 1/71637 |
| 2005/0058102 A1* | 3/2005 | Santhoff | ............. | H04B 1/7163 370/320 |
| 2005/0058114 A1* | 3/2005 | Santhoff | ............ | H04B 1/71632 370/343 |
| 2005/0058121 A1* | 3/2005 | Santhoff | ............ | H04B 1/71632 370/468 |
| 2005/0105505 A1* | 5/2005 | Fishler | ................... | H04L 7/041 370/349 |
| 2005/0195765 A1* | 9/2005 | Sharon | ................ | H04L 27/2608 370/330 |
| 2005/0265220 A1* | 12/2005 | Erlich | .................. | H04L 5/0096 370/208 |
| 2006/0233276 A1* | 10/2006 | Green | ................ | H04L 27/2601 375/267 |
| 2006/0274698 A1* | 12/2006 | Twitchell, Jr. | ........ | H04W 36/14 370/328 |
| 2008/0031205 A1* | 2/2008 | Kahola | ................. | H04L 12/413 370/338 |
| 2008/0212651 A1* | 9/2008 | Santhoff | ............ | H04B 1/71632 375/E1.001 |
| 2009/0275338 A1* | 11/2009 | Twitchell, Jr. | ........ | H04W 36/18 455/442 |
| 2011/0122924 A1* | 5/2011 | Kong | ................... | H04B 1/7183 375/138 |
| 2014/0269666 A1* | 9/2014 | Marsh | ...................... | H04J 3/06 370/350 |
| 2014/0269667 A1* | 9/2014 | Teague | .............. | H04W 56/0065 370/350 |
| 2016/0080960 A1* | 3/2016 | Aldana | ................. | H04L 43/106 370/252 |
| 2016/0341820 A1* | 11/2016 | Friedman | ................ | G01S 11/02 |
| 2017/0212210 A1* | 7/2017 | Chen | ..................... | G01S 5/0226 |
| 2017/0215037 A1* | 7/2017 | Vamaraju | ............... | H04W 4/023 |

FOREIGN PATENT DOCUMENTS

| | | | | |
|---|---|---|---|---|
| EP | 3367122 A1 | 8/2018 | | |
| EP | 3370365 A1 * | 9/2018 | ......... | G07C 9/00309 |
| EP | 3370365 A1 | 9/2018 | | |
| WO | WO-2005099209 A2 * | 10/2005 | ........... | H04B 1/7176 |
| WO | 2014/195161 A1 | 12/2014 | | |
| WO | WO-2014195161 A1 * | 12/2014 | ............. | G01S 11/06 |

OTHER PUBLICATIONS

Islam et al., "Energy-Efficient Channel Estimation for MB-OFDM UWB System in Presence of Interferences," IEEE, ICTC 2010, pp. 149-154; 6 pages.

Kreiser et al., "Multiple Sensor Node Synchronization for Parallel UWB Communication and Ranging", 2014 IEEE International Conference on Ultra-WideBand (ICUWB), Sep. 1, 2014, pp. 398-402.

* cited by examiner

SYSTEMS AND METHODS FOR SELECTING ULTRA-WIDEBAND PREAMBLE ACCORDING TO ENVIRONMENTAL CONDITION

FIELD

The present disclosure relates generally to ultra-wideband (UWB) wireless communications, and more specifically, to a UWB device such as a transceiver that processes a preamble sequence according to the environment in which the UWB device is used.

BACKGROUND

UWB technology is used in wireless applications because of its exceptional positioning accuracy and high data throughput as compared to other wireless technologies. UWB devices typically output power over a bandwidth greater than 100 MHz in order to allow a determination of time-of-flight (ToF) or related signal strength measurements, and thus an accurate estimate of distance between the transmitter and receiver.

Time-of-flight estimations generated by UWB devices can be greatly affected by the presence in the environment noise, for example, caused by reflective or damping materials in the environment, and result in error sources for a UWB range measurement include non line-of-sight, clock drift and interference, and leading to inaccurate estimations of the ToF calculation. Devices in particular that are part of a IEEE 802.15.4 system typically transmit 500 MHz or 1 GHz pulses, for example, between a user device and a UWB base unit, which are grouped in symbols in a unit of data such as a packet, frame, and so on. Typically, a preamble at the beginning of each data packet is transmitted to the receiver with relevant data to synchronize the transmitter and receiver in order to generate the ToF data. The receiving device correlates the received symbols with a predetermined preamble sequence, and generates a channel impulse response (CIR) indicating when the preamble sequence is received. This information is used by a first path detection process or the like to estimate the time-of-flight.

An IEEE 802.15.4 configuration is typically constructed and arranged to support different types of UWB preambles, which can vary in pulse repetition frequency, the employment of various sample sizes such as ternary or binary, the use of known or random symbols or other series of pulses and so on, which are employed in appropriate applications.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In brief overview, embodiments of the present inventive concepts include a system and method for selecting a UWB preamble type according to the environment and context in which a particular UWB transceiver device is used. The preamble type may affect relevant parameters such as sensitivity, resistance to preamble injection, energy consumption of the transmitting or receiving device, and so on, which can have an impact on performances of ToF estimations. Therefore, the preamble applied in a particular environment can impede the quality of a timestamp received by a UWB receiving device due to effects of the environment on the preamble. The system and method according to the inventive concepts addresses the foregoing by permitting an ideal preamble to be selected with the best performance for a specific situation, i.e., environment, context, and so on. Unlike conventional approaches, the system and method does not depend of a specific environment but instead selects a preamble among a set of available preambles according to the environment, which can provide a performance level required for the time-of-flight distance measurement between two UWB devices commensurate with the environment in which the UWB devices are used. Accordingly, time-of-arrival (ToA) estimations, which yield the time elapsed for a signal to propagate from a transmitter to a receiver or other time-related biases created by environmental conditions can be reduced to improve tracking accuracy, for example, UWB positioning accuracy.

Figure 1:
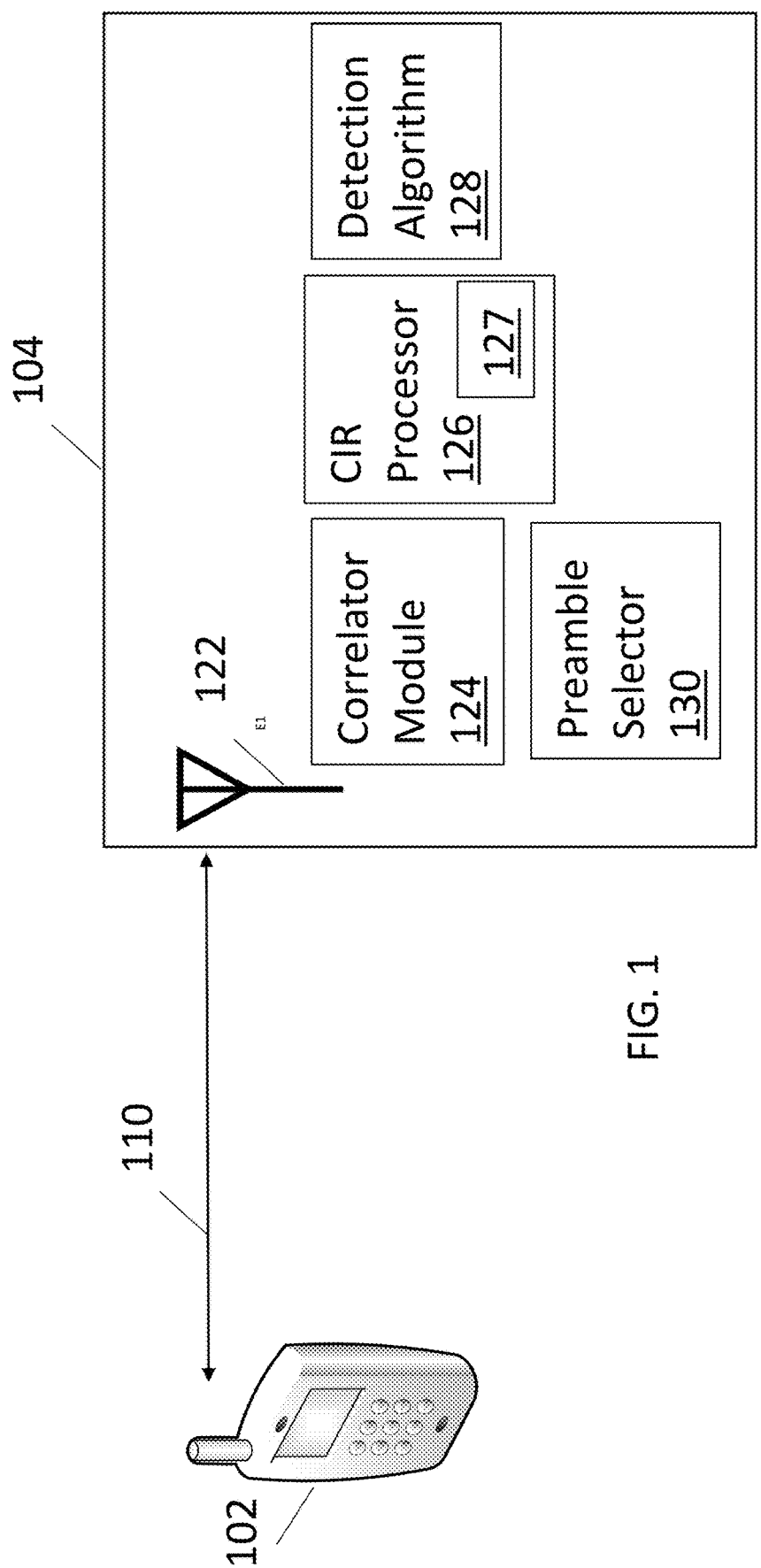
FIG. 1 is a network diagram of an environment in which embodiments of the present disclosure can be practiced.

FIG. 1 is a network diagram of an environment in which embodiments of the present disclosure can be practiced. In some embodiments, some or all of the devices in the environment shown in FIG. 1 comply with the IEEE 802.15.4 standard. As shown, two UWB wireless transceivers 102, 104 exchange data via one or more transmission channels 110, collectively referred to as a communication link.

A first UWB wireless transceiver 102 may be part of a user wireless device along with an omnidirectional antenna and processor for transmitting data using techniques which cause a spreading of the radio energy over a UWB band and at a low power spectral density and allowing a high data throughput with high precision for location and imaging devices.

A second UWB wireless transceiver 104 is constructed and arranged to detect, demodulate and/or decode signals including the data from the first UWB wireless transceiver 102 via an antenna 122. The antenna 122 may receive the signals as a set of pulses within a number of narrower bands of a multiband UWB signal. In some embodiments, the first UWB wireless transceiver 102 and/or the second UWB wireless transceiver 104 includes both a transmitter and receiver, and is electrically coupled to an antenna 122. Although a single antenna 122 is shown, the wireless device (the first UWB wireless transceiver 102 and/or the second UWB wireless transceiver 104) include (not shown) multiple transmitters, multiple receivers, multiple transceivers, and/or multiple antennas. The antenna 122 may communicate with a signal detector or the like that detects and quantifies the signals received by the transceiver 104, for example, energy levels, power spectral density and so on. In some embodiments, the first and second wireless transceivers 102, 104 are each part of a wireless device that includes a processing unit 26 that controls the operation of transceiver circuitry and an associated antenna 122 and a memory device for storing program code for execution by the processing unit to perform the processing required to control the transceiver 102, 104.

In addition to the antenna 122, the second UWB wireless transceiver 104 includes a correlator module 124, a channel impulse response (CIR) processor 126, a detection algorithm processor 128, and a preamble selector 130. Some or all of these components may be part of the first UWB wireless transceiver 102 in order to receive communications from the second UWB wireless transceiver 104.

A well-known feature of UWB data exchanges is that transmission channels are used to output, or otherwise exchange with UWB devices, a plurality of pulses of electromagnetic energy, or symbols at a predetermined number of bits per second and at high frequencies in compliance with the IEEE 802.15.4 standard, but not limited thereto. Here, the first UWB wireless transceiver 102 can encode a predetermined number of bits into each pulse, which in turn is transmitted by the transmission channel 110. Of particular relevance is the transmission of a UWB preamble. Preamble symbols are obtained by modulating consecutive pulses output periodically according to a ternary preamble code of length, which can be affected by a noisy environment or other external condition.

The correlator module 124 receives and demodulates an ultra-wideband signal from the transmission channel 110 and correlates each received UWB symbol with a known code sequence, for example, including ternary codes established by an IEEE standard or the like, and which is required for synchronization between the UWB devices 102, 104. In some embodiments, the correlator module 124 includes a plurality of parallel correlator devices, each receiving a frequency sub-band of an output signal transmitted by the first UWB wireless transceiver 102. The correlator module 124 produces a pulse that matches in frequency and phase a UWB pulse generated by a UWB transmitter 102, for example, to perform pulse-pair correlation functions with respect to received signal pulses. The correlator module 124 can includes mixers, amplifiers, and band-pass and low-pass filters, and so on to correlate the incoming signal with a known code sequence established by an IEEE standard or the like, then output to the CIR processor 126. For example, the results of the correlation operation performed on each UWB symbol are combined to generate a CIR. The CIR processor 126 communicates with the detection algorithm processor 128 so that the CIR is generated to estimate the instant on which the signal is received. In some embodiments, the processor 128 includes a special-purpose hardware processor that executes a first path detection process to process the CIR or the like in order for the system to estimate the time-of-flight distance measurement. The CIR processor 126 may include an energy estimator processor 127 that provides a reference signal for correlating with an input pulse for accurate tuning to an incoming UWB symbol. In some embodiments, the detection algorithm processor 128 may include the energy estimator processor 127.

In some embodiments, the detection algorithm processor 128 estimates the instant when the signal from the originating UWB device 102 is received. In particular, a time-of-arrival (ToA) of a time stamp provided from an incoming signal is measured when a message is received by the UWB device. The detection algorithm processor 128 operates to calculate the time-of-flight of the signal using time stamp contents of multiple messages. By comparing the time of original transmission to the ToA, the UWB transceiver 104 can determine a time-of-flight or other signal strength measurement.

The preamble selector 130 selects an appropriate preamble to replace the preamble of the received signal according to the environment, and that performs in an optimal manner for the specific environment. The preamble selector 130 communicates with the detection algorithm processor 128, which can provide a result of a CIR analysis, which can provide information on a number of reflections, signal power level, noise-related data, or other environment calculations. In addition, or alternatively, the detection algorithm processor 128 provides data where the environment is predetermined, for example, known a priori, and this data is used by the preamble selector 130 to determine a preamble according to the known environment.

As described herein, the generation of the CIR, and therefore the estimation of a timestamp calculation, can be affected by the preamble characteristics. For example, a longer preamble length may depend on transmission length or other transmission parameters. In another example, the presence of a movement of a device may determine the use of a shorter preamble. A longer preamble (for example, 1024 symbols) requires increased sensitivity (e.g., −102 to −106 dBm) due to the additional amount of data in the message, which can allow for a more accurate timestamp. The shorter preamble (e.g., 256 symbols) at a lesser sensitivity (e.g., −92 to −94 dBm) may be preferable because the distance between UWB devices 102, 104 changes due to movement of the receiving UWB device 104 However, longer preamble lengths, for example, a length sufficient to include 1024 symbols, may increase energy consumption because the device must be active for a longer period of time than for shorter preamble lengths. The tradeoff is that the preamble length can also indicate an increase in a number of correlation data produced from the large number of signals in the preamble that contribute to the CIR at the receiving device 104, which can in turn improve sensitivity that is desirable in noisy environments. Other preambles may be shorter, and inserted into the data stream for a quick resynchronization. The second UWB wireless transceiver 104 can receive a preamble of any length, or number of symbols. Accordingly, the tradeoff between preamble length and energy consumption may have an impact on the ToF estimate calculations.

In another example, a random or secure preamble may be used for a timestamp estimation. Here, the timestamp does not require an estimation on the CIR generated from the ipatov preamble under the IEEE 802.15.4 standard. Accordingly, the number of correlated symbols in random preambles is constant, whereas ipatov symbols may be lost. For example, when in a reception mode, the device may scan the air for the preamble, during which the initial part of the preamble may be lost. The amount of lost symbols can vary according to link budget and sensitivity, and/or other factors. The CIR processor 126 may operate on the accumulated correlation of the repeated symbols of an ipatov preamble sequence, which is necessary for synchronization. In some embodiments, a random sequence preamble may be present. A feature of a random preamble is the added security to preamble injection attacks or the like. On the other hand, ipatov symbols provide desirable autocorrelation properties. Accordingly, the preamble selector 130 may select an ipatov preamble or a random or secure preamble according to the environment in view of the advantages and disadvantages of each preamble type.

In another example a parameter may include pulse repetition frequency (PRF). A frame preamble needs to be appropriate for configured transmit parameters such as PRF. A higher PRF may produce a signal with more information that can be used for correlation. However, additional pulses of a higher PRF may result in the pulses that are close to each other resulting in the generating of autocorrection side lobes or the like that reduce the possibility of discriminating between two different signal paths that are close together, which can impact the accuracy of correlation and the CIR.

In other examples, the pulse shape may be affected by environmental factors such as antenna characteristics, reflections, material traversed by the signal, and so on.

Figure 2:
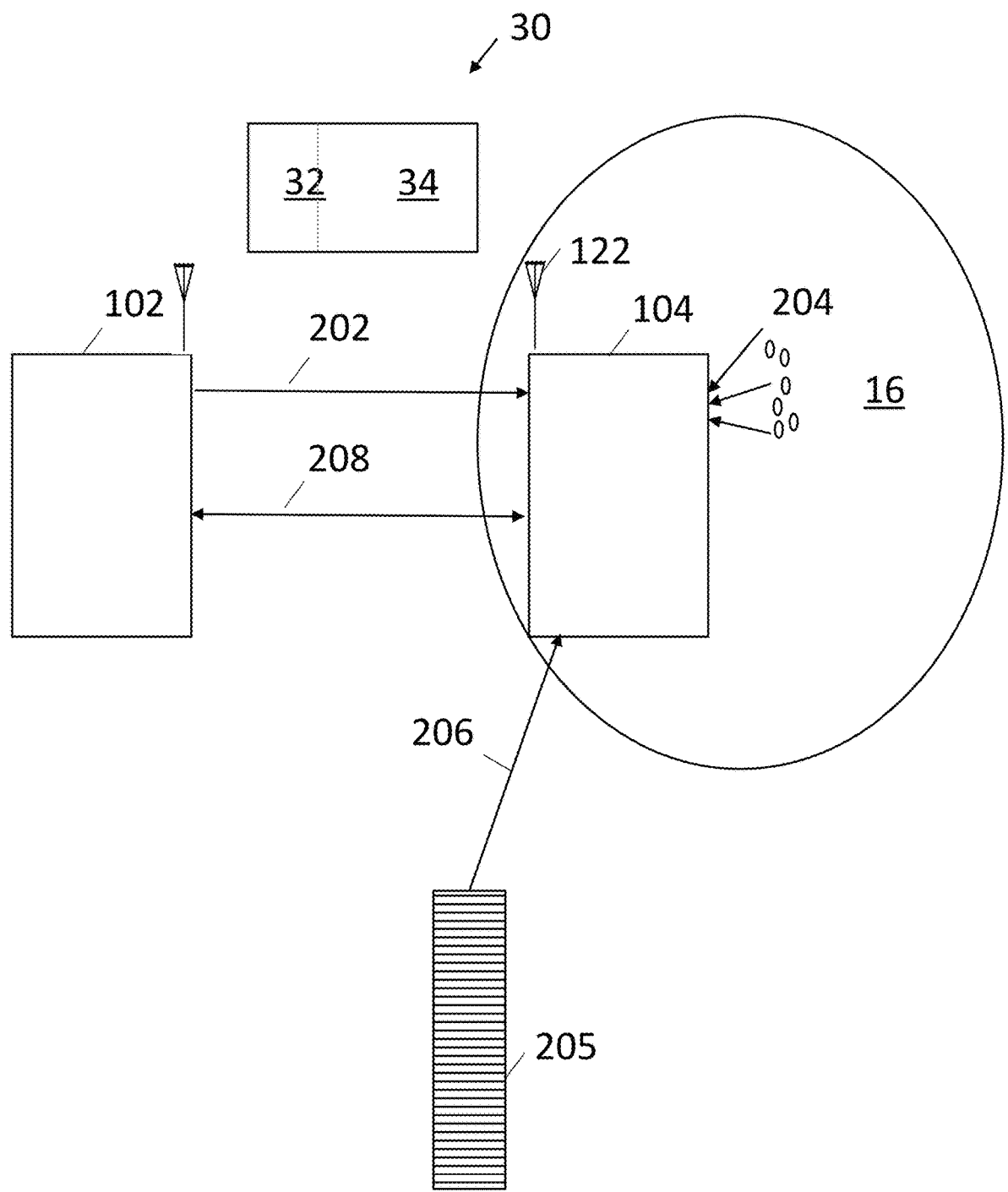
FIG. 2 is a schematic diagram illustrating a process for selecting a UWB preamble according to a particular environmental condition, in accordance with an example embodiment of the present disclosure.

The examples herein illustrate how the generation of the CIR, and thus the estimation of a timestamp, can be affected by preamble characteristics, but are not limited thereto. FIG. 2 illustrates a system and method for optimizing the preamble according to the context in which a UWB device is used. As described in FIGS. 3 and 4, different techniques can be implemented for detecting the environment, for example, analyzing the CIR (FIG. 3) or determining the environment in a static or a priori manner (FIG. 4).

FIG. 2 is a schematic diagram illustrating a process for selecting a UWB preamble according to a particular environmental condition, in accordance with an example embodiment of the present disclosure.

Data flow 202 occurs via a transmission channel formed between the first UWB wireless transceiver 102 and/or the second UWB wireless transceiver 104. The transmission channel exchanges multi-symbol packets. Each transmitted packet 30 comprises a preamble 32 and a multi-symbol data payload 34. The preamble 32 can include, for example but not limited to, a synchronization part for providing packet detection, timing data, or the like. As described herein, the second UWB wireless transceiver 104 described in FIG. 1 can change the characteristics of the contents of the preamble portion 32 of the packet 3 according to the environment, and provide a trade-off between security, time-of-flight accuracy, and energy consumption in different applications of a system including the transceivers 102, 104.

In view of the foregoing, the second UWB wireless transceiver 104 is in a surrounding environment 16, which may include a context in which the UWB device 104 is used. For example, the surrounding environment 16 may include a building, car, or other closed environmental factors where dense multipath signal exchanges may occur, or may include an open area outside a building where few such reflections are anticipated. Accordingly, environment conditions 204 are applied for the presence of reflective material that affects the preamble type regarding sensitivity, energy consumption, discriminating reflection temporally proximal the first path, and so on.

A set of preambles 205 may be stored a database or related storage apparatus. The database may include a table, matrices, or the like populated with records that identify preambles that are preferable for particular environmental conditions, and selected according to the environment. In response to the environment 16, an appropriate preamble is selected and output via data flow path 206 to the second UWB wireless transceiver 104, where it replaces the preamble sent by the first UWB wireless transceiver 102, where subsequent communications are exchanged via data flow path 208 using the preamble from a set of preambles 205 stored in the database. Subsequent communications between the UWB devices 102, 104 occur using the new preamble.

Figure 3:
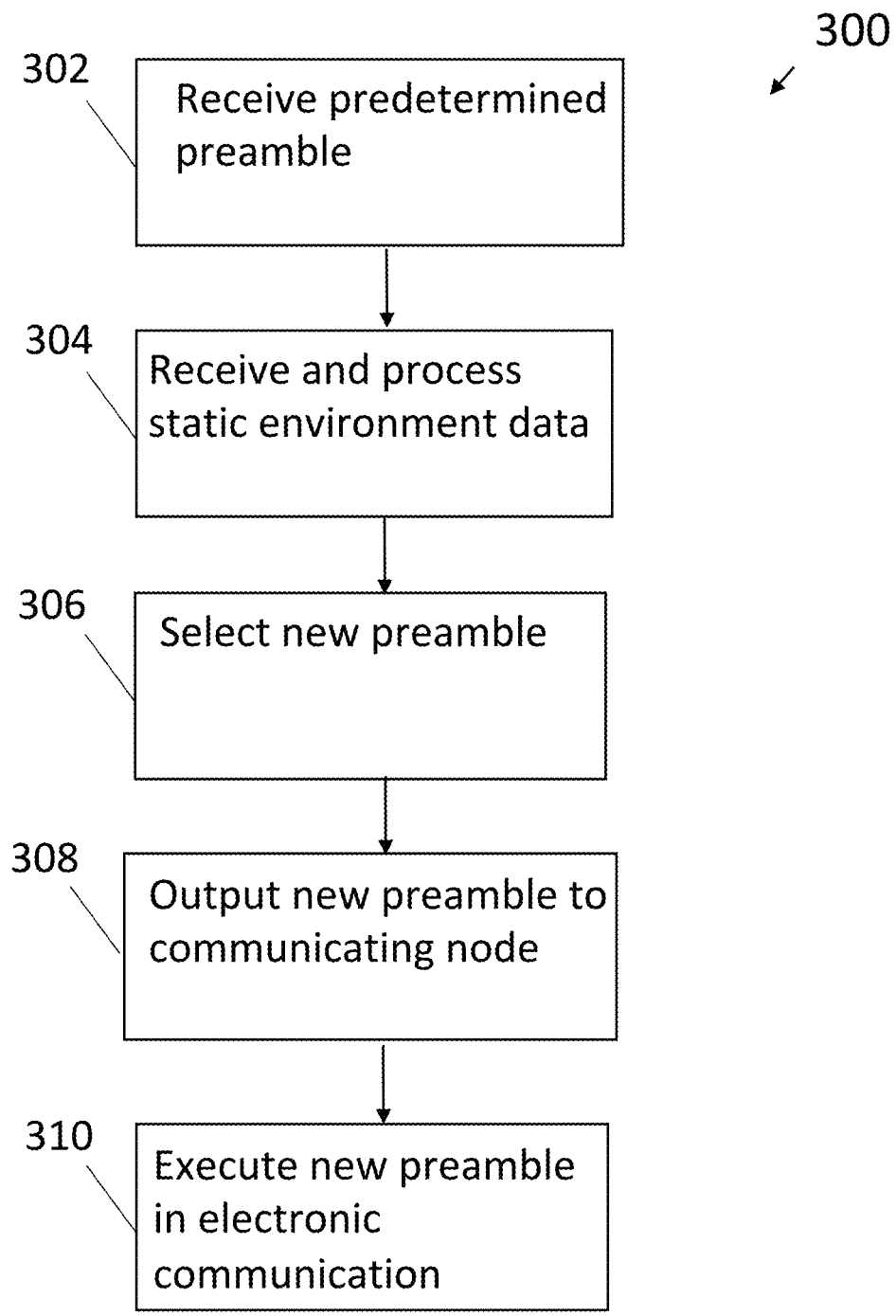
FIG. 3 is a flowchart illustrating a method for selecting a preamble used for a transmission between UWB electronic devices, in accordance with an example embodiment of the present disclosure.
Figure 4:
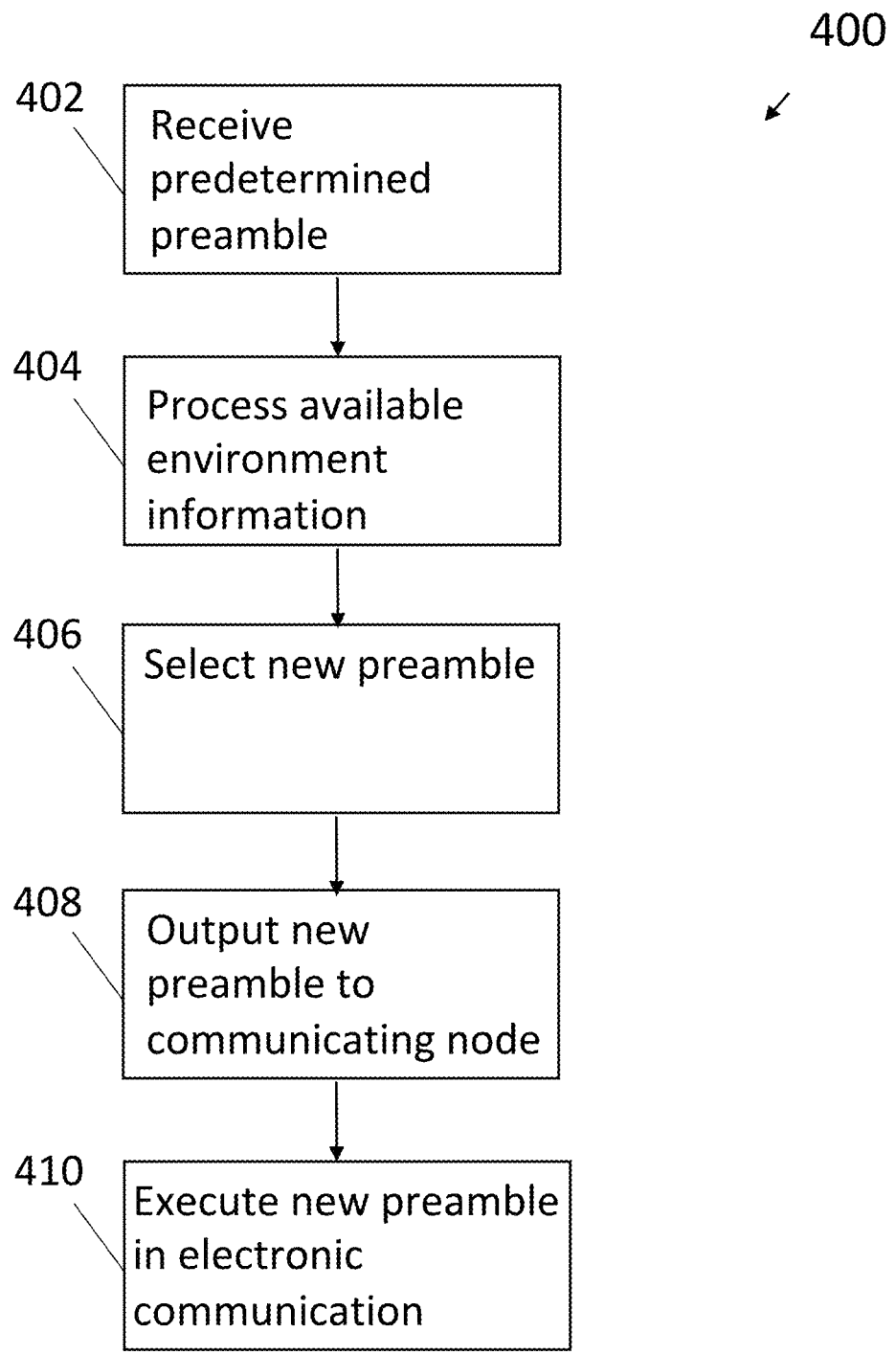
FIG. 4 is a flowchart illustrating a method for selecting a preamble used for a transmission between UWB electronic devices, in accordance with another example embodiment of the present disclosure.

FIG. 3 is a flowchart illustrating a method 300 for selecting a preamble used for a transmission between UWB electronic devices 102, 104, in accordance with an example embodiment of the present disclosure. In describing the method 300, reference is made to FIGS. 1 and 2.

At block 302, a UWB receiver of the second UWB wireless transceiver 104 receives a preamble from a UWB transmitter of the first UWB wireless transceiver 102. The preamble is used for signal detection, frame synchronization, and/or other features, and in particular, for synchronizing the transmitter and receiver in order to generate time-of-flight data required for UWB communications.

At block 304, a CIR analysis is performed to detect the environment so that an estimation of a timestamp can be obtained that is affected by characteristics of the preamble. The CIR analysis can provide information on the number of reflections from objects in the environment, power of the signal, noise level, or the like to determine an appropriate preamble. An appropriate preamble is required to mitigate errors associated with distance-related measurements caused by non line-of-sight, clock drift, interference, and so on. In some embodiments, after CIR acquisition, key features are analyzed, such as but not limited to umber of peaks in CIR, energy of CIR, a distance between two paths of a multipath configuration, first path skewness, kurtosis, and so on. In some embodiments, a machine learning algorithm classifies the environment, and the system provides a decision for the most suitable preamble for that environment.

Accordingly, at block 306, a new preamble is selected. At block 308, the new preamble is output from the second UWB wireless transceiver 104 to the first transceiver 102. At block 310, subsequent electronic communications between the UWB transceivers 102, 104 are performed using the new preamble. In some embodiments, UWB transceivers 102, 104 are synchronized in response to the CIR analysis for generating data required for estimating a time-of-flight distance measurement that includes the new preamble.

FIG. 4 is a flowchart illustrating a method 400 for selecting a preamble used for a transmission between UWB electronic devices, in accordance with another example embodiment of the present disclosure. In describing the method 300, reference is made to FIGS. 1 and 2.

At block 402, a UWB receiver of the second UWB wireless transceiver 104 receives a preamble from a UWB transmitter of the first UWB wireless transceiver 102. Block 402 is similar to block 302 of FIG. 3 so details thereof are not repeated for brevity.

At block 404, information about the environment in which the receiving UWB device 104 is provided is received and processed. Accordingly, the environment is detected in a static manner. Here, the environment is known a priori. This information can be used, for example, when tracking a UWB device using sensors or other electronic components of the device, a device in communication with an IoT sensor, and so on. If this device is outside a building, few reflections and diffractions from objects in the environment are anticipated. However, when the device is inside a building, reflections from obstacles present in an indoor environment can cause multipath fading, which can degrade the positioning accuracy of the UWB system.

At block 406, in response to the processing of the environment data, a new preamble is selected. At block 408, the new preamble is output from the second UWB wireless transceiver 104 to the first transceiver 102. At block 410, subsequent electronic communications between the UWB transceivers 102, 104 are performed using the new preamble.

As will be appreciated, embodiments as disclosed include at least the following. In one embodiment, an ultra-wideband (UWB) wireless communication system comprises a first wireless transceiver that outputs a unit of data having a first preamble that includes data for performing a time-of-flight distance measurement; a second wireless transceiver that replaces the first preamble of the unit of data with a second preamble for providing a performance level required for the time-of-flight distance measurement between the first and second wireless transceivers commensurate with an environment in which the second wireless transceiver is used; and a communication link between the first and second wireless transceivers that transmits the unit of data having the first preamble from the first wireless transceiver to the second wireless transceiver, transmits the second preamble from the second wireless transceiver to the first wireless transceiver, and exchanges subsequent electronic communications between the first and second wireless transceivers using the second preamble.

Alternative embodiments of the UWB wireless communication system include one of the following features, or any combination thereof. The communication link transmits the unit of data in an ultra-wideband signal formatted to include a plurality of symbols at a predetermined number of bits per second in compliance with the IEEE 802.15.4 standard. The second wireless transceiver correlates the received symbols with a predetermined preamble sequence, and generates a channel impulse response (CIR) indicating when the preamble sequence is received. The UWB wireless communication system further comprises a special-purpose hardware processor that executes a first path detection algorithm to process the CIR or the like to estimate the time-of-flight distance measurement. The second wireless transceiver comprises a correlator module that receives and demodulates the ultra-wideband signal from the communication link and correlates each received UWB symbol with a known sequence; a channel impulse response (CIR) processor that generates a CIR from a correlation result of the each UWB symbol with the known sequence; and a detection algorithm processor that processes the CIR and compares a time of an original transmission of the unit of data to a time-of-arrival to estimate the time-of-flight distance measurement. The UWB wireless communication system further comprises an energy estimator processor that provides a reference signal for tuning a UWB pulse template to the UWB symbol. The UWB wireless communication system further comprises a preamble selector that selects the second preamble by the CIR processor performing a CIR analysis process for synchronizing a transmitter of the first wireless transceiver and a receiver of the second wireless transceiver for generating data required for estimating the time-of-flight distance measurement. The UWB wireless communication system further comprises a preamble selector that selects the second preamble in response to the second wireless transceiver activating a sensor to detect the environment.

In another embodiment, an ultra-wideband (UWB) wireless transceiver, comprises an antenna that detects and quantifies an ultra-wideband signal; a detection algorithm processor that processes a unit of data of the ultra-wideband signal to calculate a time-of-arrival of the signal; and a preamble selector that selects a preamble for the unit of data so that the calculated time-of-arrival accounts for the environment in which the second wireless transceiver is used.

Alternative embodiments of the UWB wireless transceiver include one of the following features, or any combination thereof. The antenna receives the signals as a set of UWB pulses within one or more bands of the UWB signal, and the UWB wireless transceiver further comprises a correlator module that produces a pulse that matches in frequency and phase a pulse of the set of UWB pulses to perform a pulse-pair correlation function. The UWB wireless transceiver further comprises an energy estimator processor that provides a reference signal for tuning a template including the UWB pulses to the UWB symbols. The UWB wireless transceiver further comprises a special-purpose hardware processor that executes a first path detection process using the pulse-pair correlation function to process a channel impulse response (CIR) indicating a time when the unit of data is received, which in turn is processed to estimate the time-of-flight distance measurement. The preamble selector selects the preamble to mitigate errors associated with distance-related measurements. The UWB wireless transceiver further comprises a CIR processor that performs a CIR analysis process for synchronizing a transmitter of the first wireless transceiver and a receiver of the second wireless transceiver, wherein the preamble selector selects the preamble in response to the CIR processor performing the CIR analysis to generate time-of-flight data required for estimating the time-of-flight distance measurement. The preamble selector selects the preamble in response to the transceiver activating a sensor to detect the environment.

In another embodiment, a method for determining a distance between a first ultra-wideband (UWB) device and a second UWB device, comprises receiving by the second UWB device a unit of data including a first preamble, the contents of which are prone to an environment of the second UWB device; and replacing the first preamble with a second preamble that accounts for the environment in which the second UWB device is used.

Alternative embodiments of the method include one of the following features, or any combination thereof. The method further comprises transmitting by the second UWB the second preamble to the first UWB device; and exchanging subsequent electronic communications between the first and second UWB devices using the second preamble. The method further comprises selecting the second preamble by a channel impulse response (CIR) processor performing a CIR analysis process; and synchronizing in response to the CIR analysis a transmitter of the first UWB device and a receiver of the second UWB device for generating data required for estimating a time-of-flight distance measurement that includes the second preamble. The method further comprises selecting the second preamble in response to a detection of the environment a priori. The second preamble is an ipatov preamble or a random or secure preamble selected according to the environment of the second UWB device.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. An ultra-wideband (UWB) wireless communication system, comprising:
    a first wireless transceiver that outputs a unit of data having a first preamble that includes data for performing a time-of-flight distance measurement;
    a second wireless transceiver that replaces the first preamble of the unit of data with a second preamble for providing a performance level required for the time-of-flight distance measurement between the first and second wireless transceivers wherein the second preamble is selected based on a channel characteristic of a channel between the first wireless transceiver and the second wireless transceiver; and
    a communication link between the first and second wireless transceivers that transmits the unit of data having the first preamble from the first wireless transceiver to the second wireless transceiver over the channel, transmits the second preamble from the second wireless transceiver to the first wireless transceiver over the channel, and exchanges subsequent electronic communications between the first and second wireless transceivers using the second preamble, the UWB wireless communication system further comprising a preamble selector that selects the second preamble by a channel impulse response (CIR) processor performing a channel impulse response (CIR) analysis process for synchronizing a transmitter of the first wireless transceiver and a receiver of the second wireless transceiver for generating data required for estimating the time-of-flight distance measurement.

2. The UWB wireless communication system of claim 1, wherein the communication link transmits the unit of data in an ultra-wideband signal formatted to include a plurality of symbols at a predetermined number of bits per second in compliance with the IEEE 802.15.4 standard.

3. The UWB wireless communication system of claim 2, wherein the second wireless transceiver correlates the received symbols with a predetermined preamble sequence, and generates the channel characteristic as a channel impulse response (CIR) indicating when the preamble sequence is received.

4. The UWB wireless communication system of claim 3, further comprising a special-purpose hardware processor that executes a first path detection process to process the CIR or the like to estimate the time-of-flight distance measurement.

5. The UWB wireless communication system of claim 1, wherein the second wireless transceiver comprises:
    a correlator module that receives and demodulates the ultra-wideband signal from the communication link and correlates each received UWB symbol with a known sequence;
    the channel impulse response (CIR) processor that generates the channel characteristic as a CIR from a correlation result of the each UWB symbol with the known sequence; and
    a detection algorithm processor that processes the CIR and compares a time of an original transmission of the unit of data to a time-of-arrival to estimate the time-of-flight distance measurement.

6. The UWB wireless communication system of claim 5, further comprising an energy estimator processor that provides a reference signal for tuning a UWB pulse template to the UWB symbol.

7. The UWB wireless communication system of claim 5, further comprising a preamble selector that selects the second preamble in response to the second wireless transceiver activating a sensor to detect the channel characteristic of the channel.

8. An ultra-wideband (UWB) wireless transceiver, comprising: an antenna that detects and quantifies an UWB signal; a detection algorithm processor that processes a unit of data of the ultra wideband signal to calculate a time-of-arrival of the signal; and a preamble selector that selects a preamble for the unit of data, wherein a time-of-arrival is calculated based on the selected preamble; and wherein the preamble is selected based on a channel characteristic of a channel between the wireless transceiver and a remote transceiver, the UWB wireless transceiver further comprising a channel impulse response (CIR) processor that performs a channel impulse response (CIR) analysis process for synchronizing a transmitter of the first wireless transceiver and a receiver of the second wireless transceiver, wherein the preamble selector selects the preamble in response to the CIR processor performing the CIR analysis to generate time-of-flight data required for estimating the time-of-flight distance measurement.

9. The UWB wireless transceiver of claim 8, wherein the antenna may receive the signals as a set of UWB pulses within one or more bands of the UWB signal, and wherein the UWB wireless transceiver further comprises a correlator module that produces a pulse that matches in frequency and phase a pulse of the set of UWB pulses to perform a pulse-pair correlation function.

10. The UWB wireless transceiver of claim 9, further comprising an energy estimator processor that provides a reference signal for tuning a template including the UWB pulses to the UWB symbols.

11. The UWB wireless transceiver of claim 9, further comprising a special-purpose hardware processor that executes a first path detection process using the pulse-pair correlation function to process the channel characteristic as a channel impulse response (CIR) indicating a time when the unit of data is received, which in turn is processed to estimate the time-of-flight distance measurement.

12. The UWB wireless transceiver of claim 8, wherein the preamble selector selects the preamble to mitigate errors associated with distance-related measurements.

13. The UWB wireless transceiver of claim 8, wherein the preamble selector selects the preamble in response to the transceiver activating a sensor to detect the channel characteristic of the channel.

14. A method for determining a distance between a first ultra-wideband (UWB) device and a second UWB device, comprising: receiving by the second UWB device a unit of data including a first preamble; and replacing the first preamble with a second preamble, wherein the second preamble is selected based on a channel characteristic of a channel between the first UWB device and the second UWB device determined by a channel impulse response (CIR) analysis process for synchronizing a transmitter of the first UWB device and a receiver of the second UWB device for generating time of flight data required for estimating a time-of-flight distance measurement.

15. The method of claim 14, further comprising:
    transmitting by the second UWB the second preamble to the first UWB device;
    and
    exchanging subsequent electronic communications between the first and second UWB devices using the second preamble.

16. The method of claim 14, further comprising:

selecting the second preamble by a channel impulse response (CIR) processor performing the CIR analysis process; and synchronizing in response to the CIR analysis the transmitter of the first UWB device and the receiver of the second UWB device for generating the data required for estimating the time-of-flight distance measurement that includes the second preamble.

17. The method of claim 14, further comprising:

selecting the second preamble in response to a detection of the channel characteristic of the channel a priori.

18. The method of claim 14, wherein the second preamble is an ipatov preamble or a random or secure preamble selected according to the channel characteristic of the channel between the first UWB device and the second UWB device.

* * * * *